United States Patent
Suwa

(10) Patent No.: US 10,312,038 B2
(45) Date of Patent: Jun. 4, 2019

(54) VOLTAGE DIVIDING CAPACITOR

(71) Applicant: MEIDENSHA CORPORATION, Tokyo (JP)

(72) Inventor: Akihiro Suwa, Numazu (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 16/075,783

(22) PCT Filed: Mar. 13, 2017

(86) PCT No.: PCT/JP2017/009889
§ 371 (c)(1),
(2) Date: Aug. 6, 2018

(87) PCT Pub. No.: WO2017/159588
PCT Pub. Date: Sep. 21, 2017

(65) Prior Publication Data
US 2019/0051474 A1   Feb. 14, 2019

(30) Foreign Application Priority Data
Mar. 17, 2016   (JP) ................. 2016-053696

(51) Int. Cl.
*H01H 33/662* (2006.01)
*H01H 33/16* (2006.01)
(Continued)

(52) U.S. Cl.
CPC .......... *H01H 33/662* (2013.01); *H01G 4/228* (2013.01); *H01G 4/38* (2013.01); *H01G 4/40* (2013.01);
(Continued)

(58) Field of Classification Search
CPC .. H01H 33/16; H01H 2033/146; H01H 33/66; H01G 4/12; H01G 4/228; H01G 4/38; H01G 4/40
(Continued)

(56) References Cited

U.S. PATENT DOCUMENTS 3,382,412 A * 5/1968 Mankoff .................. H01G 4/38
361/13
4,434,332 A * 2/1984 Yanabu ................ H01H 33/143
218/144
(Continued)

FOREIGN PATENT DOCUMENTS

JP     7-307127 A    11/1995
JP     2007-188734 A  7/2007
(Continued)

*Primary Examiner* — Edwin A. Leon
*Assistant Examiner* — William A Bolton
(74) *Attorney, Agent, or Firm* — Foley & Lardner LLP

(57) ABSTRACT

A voltage dividing capacitor (1) arranged parallel to a vacuum interrupter (2) has a long narrow cylindrical-shaped capacitor series (16) that is configured by a plurality of capacitor elements (15) being connected with connecting screws. One end of the capacitor series (16) is supported by a fixed supporting unit (25), and the other end id supported by a movable supporting unit (26) so as to allow thermal expansion and contraction. A insulation tube (31) fixed to the movable supporting unit (26) has a short length, and only a first capacitor element (15A) is fitted into the insulation tube (31). Since a portion where high electric field appears is a middle of five capacitor elements (15) and electric field at an end portion of the capacitor series (16) is low, forming of triple junction at the portion of the high electric field is avoided.

7 Claims, 9 Drawing Sheets

(51) Int. Cl.
*H01H 33/14* (2006.01)
*H01G 4/38* (2006.01)
*H01G 4/40* (2006.01)
*H01G 4/228* (2006.01)

(52) U.S. Cl.
CPC ....... *H01H 33/16* (2013.01); *H01H 2033/146* (2013.01)

(58) Field of Classification Search
USPC ................................ 218/118, 144, 145, 143
See application file for complete search history.

(56) References Cited

U.S. PATENT DOCUMENTS

| | | | | |
|---|---|---|---|---|
| 4,492,835 | A * | 1/1985 | Turner | H01H 33/6661 218/144 |
| 6,307,729 | B1 * | 10/2001 | Fukai | H01G 4/02 361/303 |
| 6,894,886 | B2 * | 5/2005 | Eriksson | H01G 4/224 361/301.5 |
| 7,042,699 | B2 * | 5/2006 | Takahashi | H01G 5/014 361/277 |
| 2007/0242413 | A1 * | 10/2007 | Drugge | H01G 4/224 361/301.3 |
| 2014/0083288 | A1 * | 3/2014 | Tatsumi | F16J 3/041 92/47 |

FOREIGN PATENT DOCUMENTS

| | | |
|---|---|---|
| JP | 2009-54400 A | 3/2009 |
| JP | 2013-247144 A | 12/2013 |

\* cited by examiner

VOLTAGE DIVIDING CAPACITOR

TECHNICAL FIELD

The present invention relates to a voltage dividing capacitor arranged parallel to a vacuum interrupter.

BACKGROUND ART

Patent Document 1 discloses a vacuum circuit breaker in which a cylindrical voltage dividing capacitor is arranged parallel to each of a pair of vacuum interrupters. This voltage dividing capacitor is generally configured such that, as disclosed in Patent Document 2, a plurality of capacitor elements, each of which is individually molded, are arranged in series and accommodated in a substantially cylindrical insulation tube molded of insulating material such as FRP (fiber reinforced plastics).

In the above conventional voltage dividing capacitor, since a minute gap exists between an outer peripheral surface of a molded portion of each capacitor element and the insulation tube, as disclosed in Patent Document 2, there arises a problem of forming so-called triple junction where three kinds of materials whose dielectric constants are different from each other contact each other at an extremely close distance on an outer peripheral edge of an end portion in an axial direction of the molded portion. An electric field then concentrates by this triple junction, and a withstand voltage is decreased.

CITATION LIST

Patent Document

Patent Document 1: Japanese Unexamined Patent Application Publication No. 2007-188734
Patent Document 2: Japanese Unexamined Patent Application Publication No. 2013-247144

SUMMARY OF THE INVENTION

A voltage dividing capacitor arranged parallel to a vacuum interrupter according to the present invention comprises: a capacitor series configured by a plurality of capacitor elements being connected and fixed in series, wherein each of the capacitor elements has a dielectric substance between a pair of conductors and a cylindrical molded portion at an outer circumferential side of the capacitor element, the capacitor series as a whole having a long narrow cylindrical shape; a fixed supporting unit fixedly supporting one end of the capacitor series; a movable supporting unit movably supporting the other end of the capacitor series in a longitudinal direction of the capacitor series, the movable supporting unit being provided with a disk-shaped movable member and an elastic member; and an insulation tube secured to the movable supporting unit, the insulation tube having a substantially C-shaped cross section into which at least the disk-shaped movable member of the movable supporting unit is fitted, wherein a length of the insulation tube is set to such a length that a tip end of the insulation tube does not protrude from an end surface, on a fixed supporting unit side, of the molded portion of a first capacitor element that is positioned closest to the movable supporting unit.

That is, the insulation tube has such a short length that the insulation tube partly covers only a part, on a movable supporting unit side, of the capacitor series (the capacitor elements). The insulation tube could be configured so as to cover only the movable supporting unit without covering the capacitor elements. Further, the insulation tube could be configured so as to cover the first capacitor element positioned closest to the movable supporting unit. In the capacitor series having the long narrow cylindrical shape, the electric field is maximum in the middle in the longitudinal direction of the capacitor series, which is spaced apart from an end portion of the vacuum interrupter and a middle shield, and the electric field at an end portion in the longitudinal direction of the capacitor series is relatively low.

For this reason, by configuring the insulation tube such that the insulation tube does not cover the capacitor element at all or the insulation tube is fitted onto only the first capacitor element, the forming of the triple junction at the middle portion in the longitudinal direction where the electric field is maximum is avoided.

On the other hand, at the end portion, on the movable supporting unit side, of the capacitor series, the insulation tube is fitted onto an outer periphery of the disk-shaped movable member of the movable supporting unit. Therefore, a supporting strength of the capacitor series is secured. Further, a movable side shield covers a periphery of the movable supporting unit, including the elastic member and the disk-shaped movable member. The electric field is thus surely decreased.

One aspect of the present invention, the first capacitor element positioned closest to the movable supporting unit is fitted into the insulation tube. By the fact that the end portion of the capacitor series is fitted into the insulation tube, the supporting strength of the capacitor series is further increased. Since the electric field at the first capacitor element is lowest in the capacitor series, a problem by the triple junction does not substantially occur.

Another aspect of the present invention, the tip end of the insulation tube terminates at a cylindrical surface of the molded portion of the first capacitor element without covering a chamfer portion, on the fixed supporting unit side, of the molded portion of the first capacitor element.

The molded portion of the capacitor element individually formed into the cylindrical shape has the chamfer portion, generally, an R-chamfer portion having an arc shape in cross section, on an outer peripheral edge of an end portion of the molded portion. If the insulation tube overlaps this chamfer portion, a wedge-shaped gap is formed between the chamfer portion and an inner circumferential surface of the insulation tube. Because of this, concentration of the electric field, as the triple junction, is apt to occur. When the tip end of the insulation tube terminates at the cylindrical surface of the molded portion, the forming of such wedge-shaped gap is avoided.

Another aspect of the present invention, the insulation tube whose length along the longitudinal direction of the capacitor series is short is covered with a cylindrical shield that covers an end portion of the vacuum interrupter. With this, the electric field in the vicinity of or close to the insulation tube is decreased.

According to the present invention, the forming of the triple junction at the portion where the high electric field appears in the capacitor series having the long narrow cylindrical shape can be avoided. A withstand voltage as the voltage dividing capacitor can be increased.

BRIEF DESCRIPTION OF THE DRAWINGS

FIG. 3 is a sectional view taken along an A-A line of FIG. 1.

FIG. 4 is a sectional view taken along a B-B line of FIG. 1.

EMBODIMENTS FOR CARRYING OUT THE INVENTION

Embodiments of the present invention will be explained below with reference to the drawings.

Figure 1:
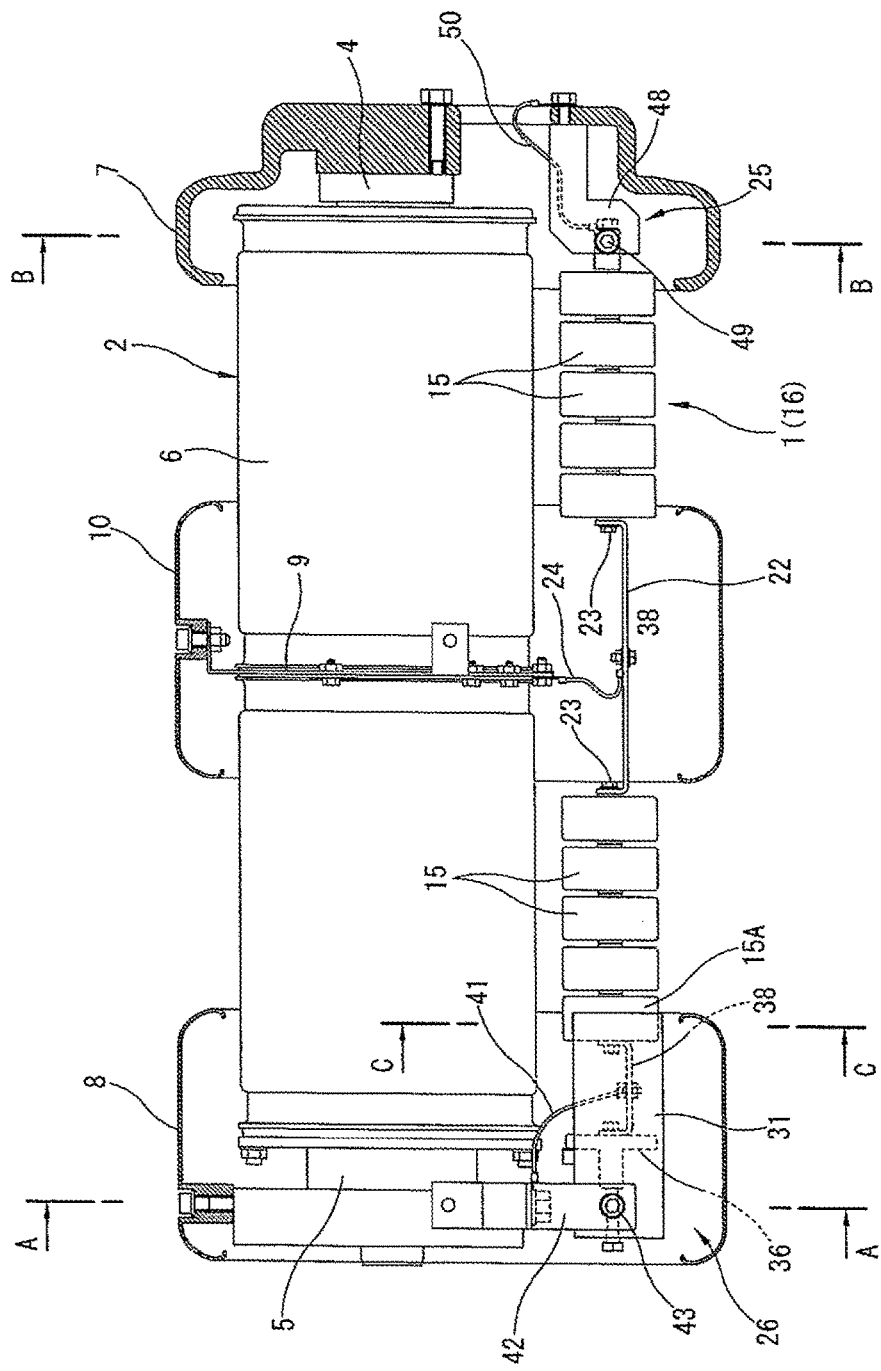
FIG. 1 is a front view showing a first embodiment of a voltage dividing capacitor according to the present invention together with a vacuum interrupter.

FIG. 1 shows a principal part of a vacuum circuit breaker provided with a voltage dividing capacitor 1 of a first embodiment and a vacuum interrupter 2. The vacuum circuit breaker has, as an entire structure, a pair of vacuum interrupters 2 arranged on right and left sides in the vacuum circuit breaker with a link mechanism (not shown) interposed in the middle of the pair of vacuum interrupters 2, as disclosed in Patent Document 1. The voltage dividing capacitor 1 is arranged parallel to each vacuum interrupter 2. These link mechanism, vacuum interrupters 2 and voltage dividing capacitors 1 are wholly accommodated in a tank (not shown), and this tank is filled with insulation gas such as $SF_6$ (sulfur hexafluoride). FIG. 1 shows the vacuum interrupter 2 and the corresponding voltage dividing capacitor 1 located on the right side in the vacuum circuit breaker.

The vacuum interrupter 2 has a fixed side conductor 4 on a right side in the drawing and a movable side conductor 5 that is connected to the link mechanism (not shown) on a left side in the drawing. The fixed side conductor 4 is provided, as an integral part, with a fixed side shield 7 that covers a fixed side end portion of a cylindrical container 6 of the vacuum interrupter 2 and a periphery of the fixed side conductor 4. A periphery of the movable side conductor 5 and a periphery of a movable side end portion of the cylindrical container 6 are covered with a movable side shield 8. This movable side shield 8 is supported by the movable side conductor 5, and is electrically connected to the movable side conductor 5. The vacuum interrupter 2 also has, in the middle in a longitudinal direction of the cylindrical container 6, an arc shield 9 that encircles a periphery of an inside electrode unit. A periphery of this arc shield 9 is covered with a middle shield 10 that is supported by and electrically connected to the arc shield 9. These fixed side shield 7, movable side shield 8 and middle shield 10 have an annular or a cylindrical shape having a substantially same diameter, and are arranged concentrically with each other.

Figures 3, 4:
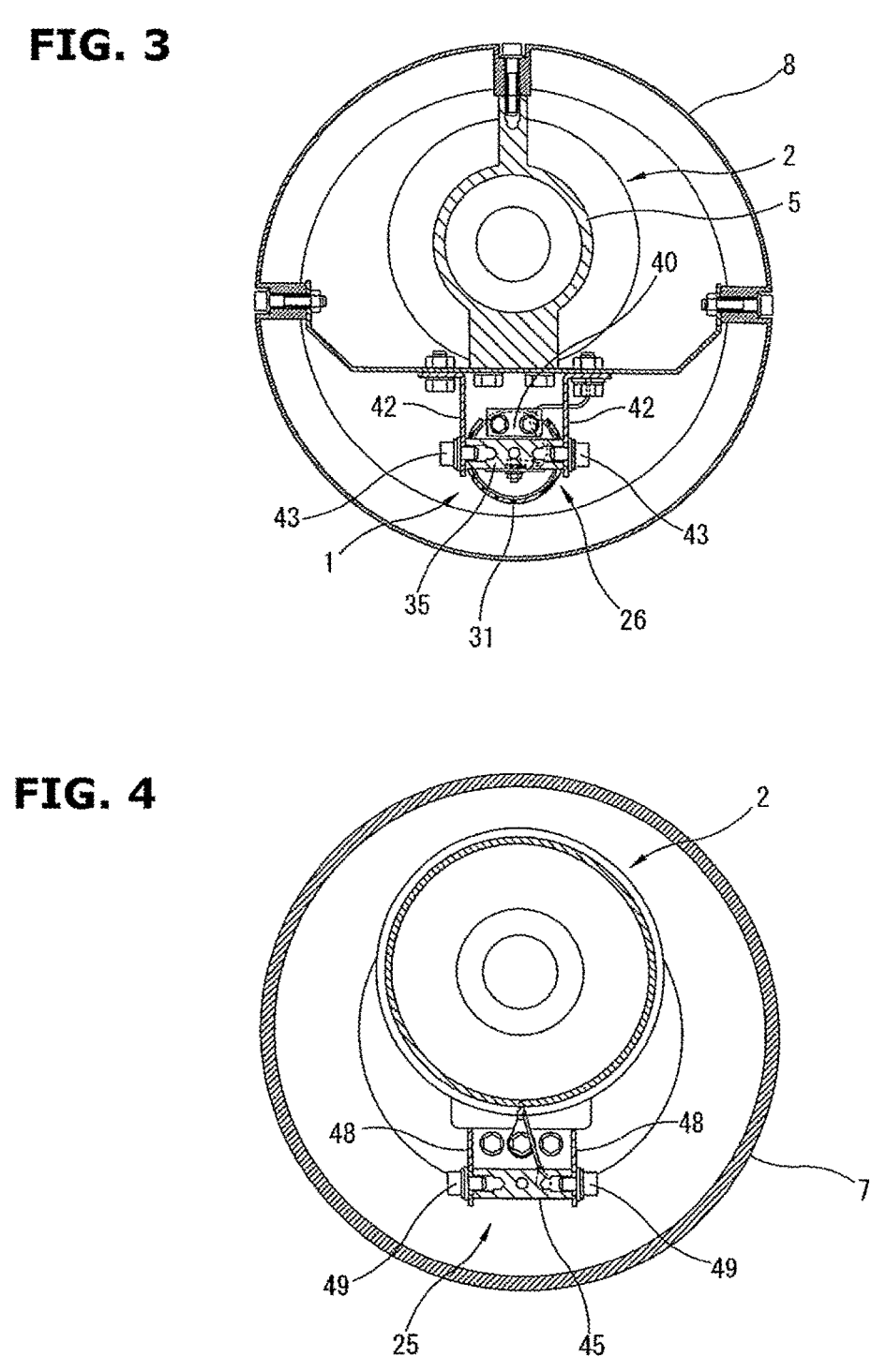

As shown by sectional views in FIGS. 3 and 4, the vacuum interrupter 2 is eccentrically positioned at an upper side with respect to a center of each of the shields 7, 8 and 10. And, the voltage dividing capacitor 1 is disposed in a space created at a lower side by this eccentric position of the vacuum interrupter 2. In other words, each of the shields 7, 8 and 10 is provided so as to orbicularly encircle peripheries of the vacuum interrupter 2 and the voltage dividing capacitor 1 which are arranged parallel to each other.

The voltage dividing capacitor 1 has, as a main body, a capacitor series 16 configured by a plurality of capacitor elements 15, whose number is determined by taking into account desired capacitance and withstand voltage, being connected and fixed in series (i.e. in a straight line). This capacitor series 16 as a whole has a long narrow cylindrical shape. And, a diameter of the capacitor series 16 is smaller than that of the cylindrical container 6 of the vacuum interrupter 2.

Figure 7:
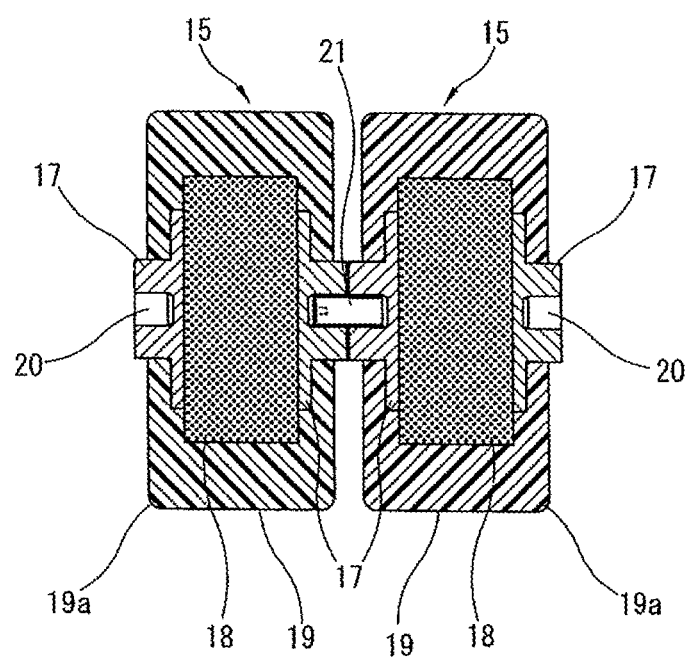
FIG. 7 is a sectional view showing a connecting structure of a capacitor element.

As schematically shown in FIG. 7, each capacitor element 15 has a dielectric substance (a dielectric) 18 between a pair of conductors 17, and also has, at an outer circumferential side, a molded portion 19 such as epoxy resin having a cylindrical shape whose axial direction size is short. Each capacitor element 15 then has a substantially cylindrical or disk shape. A screw hole 20 is provided along a center axis of the capacitor element 15 in the middle on an end surface of the conductor 17 which slightly protrudes from an end surface of the molded portion 19. Then, as shown in FIG. 7, a slotted connecting screw 21 having male screws at both end thereof is screwed into the respective screw holes 20 of the adjacent two capacitor elements 15. With this connection, the plurality of capacitor elements 15 are connected and fixed in a line with the conductors 17 positioned close to each other.

In the present embodiment shown in FIG. 1, the capacitor series 16 includes ten capacitor elements 15, namely, has a pair of capacitor groups, each of which is formed by five capacitor elements 15 being directly connected to each other. Between these two capacitor groups, a middle conductor 22 formed from a strip metal plate is interposed. This middle conductor 22 is electrically connected to the arc shield 9 of the vacuum interrupter 2 through a sheathed electric wire 24. Both end portions of the middle conductor 22 are also firmly secured and connected to the respective conductors 17 of the capacitor elements 15 with bolts 23 using the screw hole 20 provided in the middle of the conductor 17 of the capacitor element 15. Therefore, the capacitor series 16 having the ten capacitor elements 15, including the middle conductor 22, is an integral unit as a whole having sufficient rigidity.

One end of the long narrow cylindrical-shaped capacitor series 16 configured as the integral unit as described above is fixedly supported by a fixed supporting unit 25 on the right side in the drawing, and the other end is supported movably by a predetermined amount in a longitudinal direction of the capacitor series 16 by a movable supporting unit 26 in the left side in the drawing. That is, the movable supporting unit 26 on the other end side is configured to allow thermal expansion and contraction along the longitudinal direction of the capacitor series 16.

Figure 6:
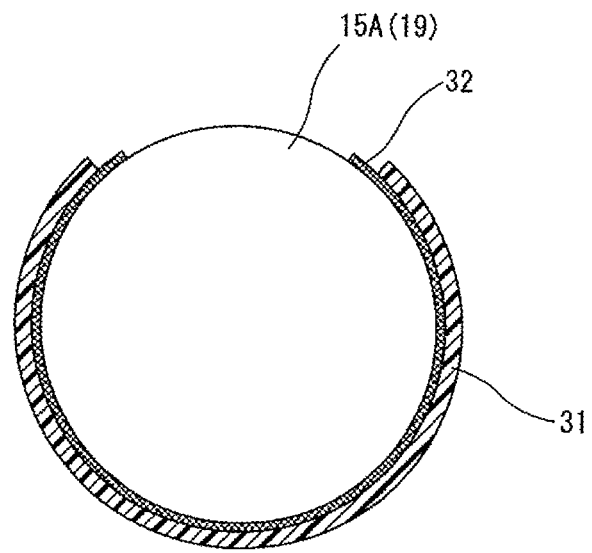
FIG. 6 is a sectional view taken along a C-C line of FIG. 1.

As shown in FIG. 1, an insulation tube 31 having such a length as to cover a part in the longitudinal direction of the capacitor series 16, more specifically, the insulation tube 31 having such a length that the insulation tube 31 extends up to a first capacitor element 15 (denoted by a reference sign 15A in FIG. 1) that is the closest capacitor element to the movable supporting unit 26 and covers the first capacitor element 15A, is secured to the movable supporting unit 26. This insulation tube 31 is made of insulating material such as FRP (fiber reinforced plastics) formed from appropriate insulative resin material as base material, and is formed into a tubular shape having a substantially C-shaped cross section as shown in FIG. 6 with a part at an upper side (i.e. at the vacuum interrupter 2 side) of a circle of the tube being open. An inside diameter of the tube is slightly larger than an outside diameter of the capacitor series 16 (the capacitor element 15). After-mentioned components or elements of the movable supporting unit 26 are placed inside the insulation tube 31. The first capacitor element 15A is fitted into an inner circumferential side of the insulation tube 31 through a sheet 32 (see FIG. 6) as a cushion made of fluorocarbon polymers (e.g. Teflon (registered trademark)).

Figure 11A:
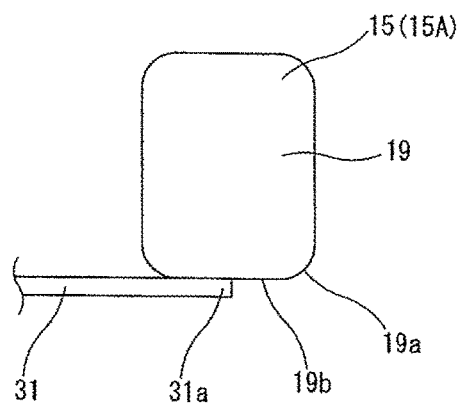
FIGS. 11A and 11B are explanatory drawings of a wedge-shaped gap at an R-chamfer portion of the capacitor element.

Here, as shown in an enlarged view of FIG. 11A, the capacitor element 15 has a chamfer portion, especially, an R-chamfer portion 19a having an arc shape in cross section, in order for an outer peripheral edge of the end surface of the molded portion 19 not to be an acute edge. And, a tip end 31a of the insulation tube 31 terminates at a cylindrical surface 19b of the molded portion 19 without covering the R-chamfer portion 19a, on the fixed supporting unit 25 side, of the first capacitor element 15A. Further, as shown in FIG. 1, the insulation tube 31 is located in an inner circumferential side of the movable side shield 8, and an axial direction position of the tip end 31a of the insulation tube 31 is within an axial direction area of the movable side shield 8. That is, the whole of the insulation tube 31 is covered with the movable side shield 8.

Figure 2:
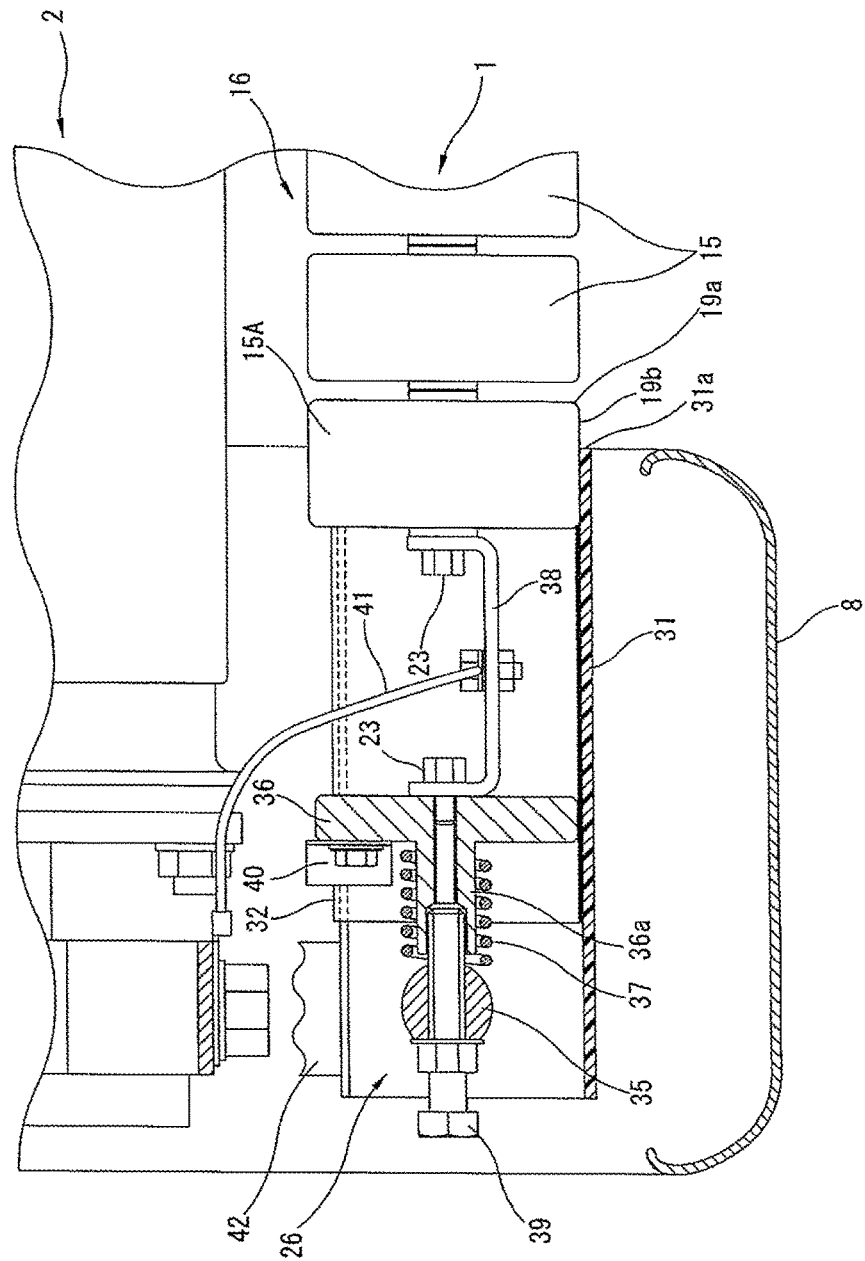
FIG. 2 is a sectional view of a principal part, showing a configuration of a movable supporting unit with an insulation tube being cut.

FIG. 2 shows a configuration of the movable supporting unit 26 with the movable supporting unit 26 covered with the insulation tube 31. The movable supporting unit 26 has a columnar pin 35 extending along a diameter direction of the capacitor series 16, a spring seat 36 as a disk-shaped movable member which can move in an axial direction (in the longitudinal direction of the capacitor series 16) in the insulation tube 31, a coil spring 37 as an elastic member which is set between the pin 35 and the spring seat 36 with the coil spring 37 being compressed, and a movable end conductor 38 formed from a strip metal plate which connects the spring seat 36 and an end portion of the capacitor series 16, i.e. an end portion of the first capacitor element 15A. The spring seat 36 has a disk-shape that is movably fitted into an inner circumferential surface of the insulation tube 31. The coil spring 37 is set on an outer circumference of a shaft portion 36a that extends from a middle portion of the disk-shaped spring seat 36 toward the pin 35. Further, an adjustment bolt 39 is screwed into a screw hole that penetrates the pin 35 in a diameter direction of the pin 35, and a tip end of the adjustment bolt 39 contacts a bottom of a hollow portion that is formed at a tip end of the shaft portion 36a. This adjustment bolt 39 limits an excessive movement of the spring seat 36 to the pin 35 side.

A guide plate 40 having a rectangular shape whose size corresponds to a width of an opening surface of the insulation tube 31 is fixed to an outer peripheral portion of the spring seat 36. As shown in FIG. 3, this guide plate 40 is fitted to the opening surface of the insulation tube 31. With this, rotation of the spring seat 36 in the insulation tube 31 is prevented, which limits rotation of the movable end conductor 38 and rotation of the capacitor series 16 as a whole.

In the same manner as the middle conductor 22, one end of the movable end conductor 38 is secured to the first capacitor element 15A with a bolt 23 screwed into the screw hole 20 provided in the middle of the conductor 17 of the capacitor element 15, and the other end is secured to the middle portion of the disk-shaped spring seat 36 with a bolt 23. The movable end conductor 38 is electrically connected to the movable side conductor 5 of the vacuum interrupter 2 through a sheathed electric wire 41.

As shown in FIG. 3, the pin 35 is supported by the vacuum interrupter 2 through a pair of substantially L-shaped brackets 42. The brackets 42 are fixed to the pin 35 with bolts 43 screwed into the both ends of the pin 35 that penetrates holes formed at the insulation tube 31.

Figure 5:
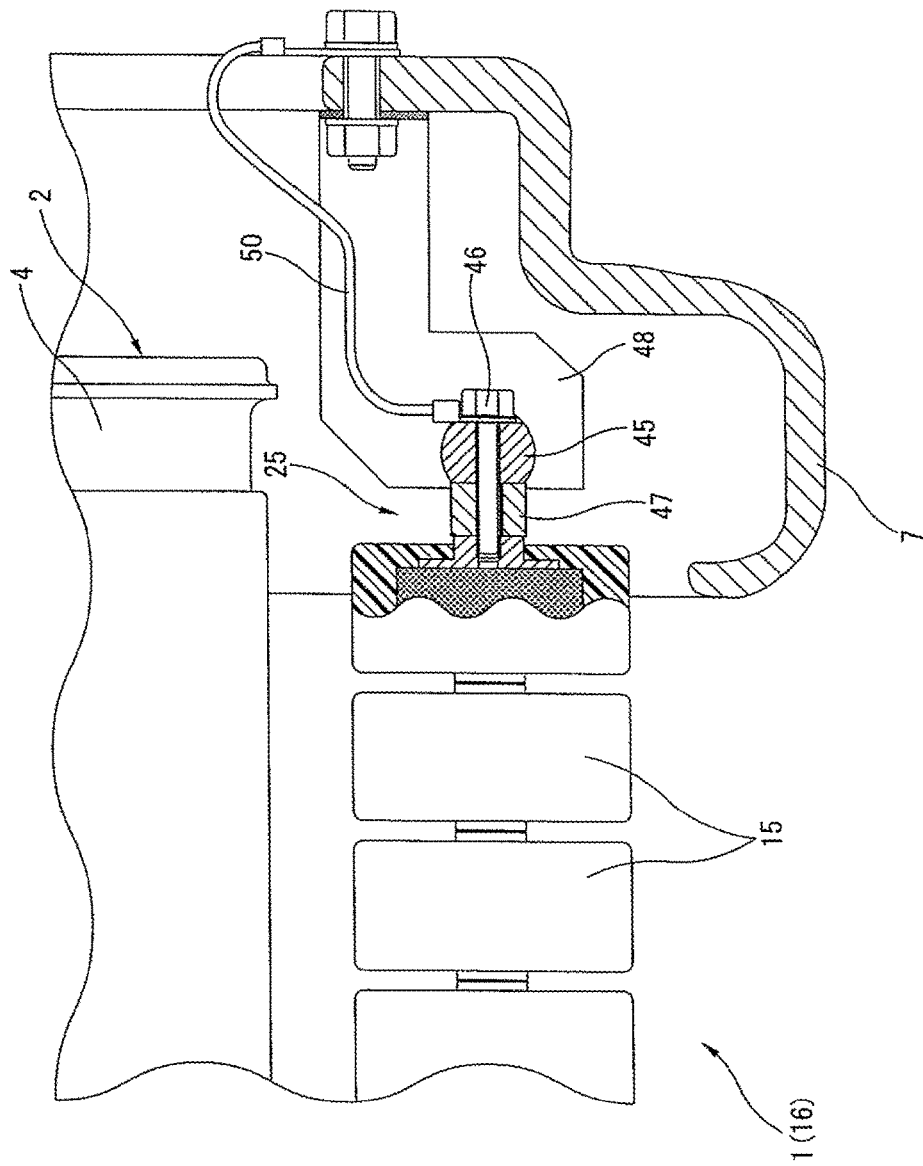
FIG. 5 is a sectional view of a principal part, showing a configuration of a fixed supporting unit.

FIGS. 4 and 5 show a configuration of the fixed supporting unit 25 that supports one end of the capacitor series 16. The fixed supporting unit 25 has a columnar pin 45 extending along the diameter direction of the capacitor series 16, a bolt 46 which penetrates the pin 45 in a diameter direction of the pin 45 and whose tip end male screw portion is screwed into the screw hole 20 provided in the middle of the conductor 17 of the capacitor element 15 at an end portion of the capacitor series 16, and a fixed end conductor 47 sandwiched between the pin 45 and the conductor 17 of the capacitor element 15. The pin 45 is supported by the vacuum interrupter 2 through brackets 48 fixed to both ends of the pin 45 with bolts 49. The fixed end conductor 47 is electrically connected to the fixed side conductor 4 of the vacuum interrupter 2 through a sheathed electric wire 50.

In the configuration of the present embodiment, the insulation tube 31 supporting the capacitor series 16 is short in length in the axial direction (in the longitudinal direction of the capacitor series 16) as compared with the capacitor series 16, and only the first capacitor element 15A closest to the movable supporting unit 26 is fitted into the insulation tube 31. Hence, the above-mentioned decrease of the withstand voltage, which is caused by the triple junction formed between the insulation tube 31 and the outer peripheral edge of the end portion of the molded portion 19 of each capacitor element 15, is suppressed. That is, an electric field is maximum at a middle capacitor element 15 in each capacitor group including the five capacitor elements 15 in the capacitor series 16 (i.e. the capacitor element 15 positioned in the middle between the fixed side shield 7 and the middle shield 10, and the capacitor element 15 positioned in the middle between the movable side shield 8 and the middle shield 10). Since the insulation tube 31 of the present embodiment is not adjacent to or contiguous to the middle capacitor element 15 at which the maximum electric field appears, the forming of the triple junction at a portion where the maximum electric field appears is avoided. Accordingly, risks of discharge and dielectric breakdown, caused by the triple junction at a portion of high electric field, are reduced.

Figure 11B:
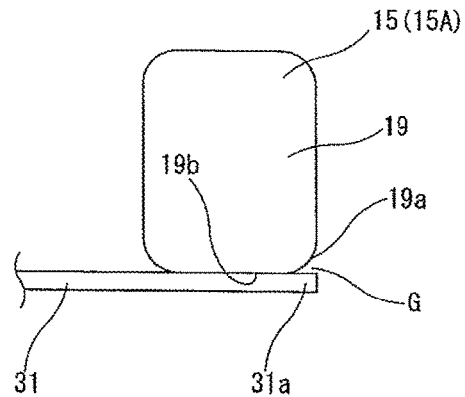

Further, as described above, the tip end 31a of the insulation tube 31 terminates at the cylindrical surface 19b of the molded portion 19 without covering the R-chamfer portion 19a of the first capacitor element 15A. Therefore, the forming of the triple junction, due to concentration of the electric field which is caused by the R-chamfer portion 19a, is avoided. That is, FIG. 11B shows, as a comparative example, a configuration in which the tip end 31a of the insulation tube 31 extends up to a position where the tip end 31a of the insulation tube 31 covers the R-chamfer portion 19a of the first capacitor element 15A. If the insulation tube 31 overlaps the R-chamfer portion 19a in this manner, since a wedge-shaped gap G is formed between the R-chamfer portion 19a and the inner circumferential surface of the insulation tube 31, the concentration of the electric field, as the triple junction, is apt to occur. As shown in FIG. 11A, when the tip end 31a of the insulation tube 31 terminates at the cylindrical surface 19b of the molded portion 19, the forming of such wedge-shaped gap G is avoided.

In the above embodiment, by setting the insulation tube 31 to be short, the whole of the insulation tube 31 is covered with the cylindrical movable side shield 8. With this, the electric field in the vicinity of or close to the insulation tube 31 is surely decreased, and discharge and dielectric breakdown between the molded portion 19 of the first capacitor element 15A and the insulation tube 31 are surely inhibited. Here, although an entire length of the insulation tube 31 is completely covered with the movable side shield 8, even if the tip end 31a of the insulation tube 31 protrudes from the movable side shield 8 in some degree, since an electric field relaxation (or lessening) effect can be obtained at the periphery of the insulation tube 31 by the movable side shield 8, the electric field in the vicinity of or close to the insulation tube 31 becomes low.

On the other hand, in the above embodiment, although the entire length of the insulation tube 31 is short, the insulation tube 31 is fitted onto an outer circumference of the first capacitor element 15A at the end portion, on the movable supporting unit 26 side, of the capacitor series 16. Therefore, a supporting strength of the capacitor series 16 is sufficiently secured. That is, it is possible to surely retain the end portion of the capacitor series 16 while allowing the thermal expansion and contraction in the longitudinal direction. Further, the spring seat 36 moving in the axial direction of the movable supporting unit 26 is surely guided by the insulation tube 31, and a periphery of the movable supporting unit 26, including the coil spring 37 and the spring seat 36 etc., is covered with the movable side shield 8. The electric field is thus surely decreased.

Here, in the drawing, the entire length of the insulation tube 31 is set such that the first capacitor element 15A is fitted into the insulation tube 31. However, the length of the insulation tube 31 could be shorter, then the first capacitor element 15A could be exposed from the tip end of the insulation tube 31. That is, the length of the insulation tube 31 is not limited as long as the insulation tube 31 has such a length that at least the disk-shaped spring seat 36 of the movable supporting unit 26 is fitted into the insulation tube 31.

Figure 8:
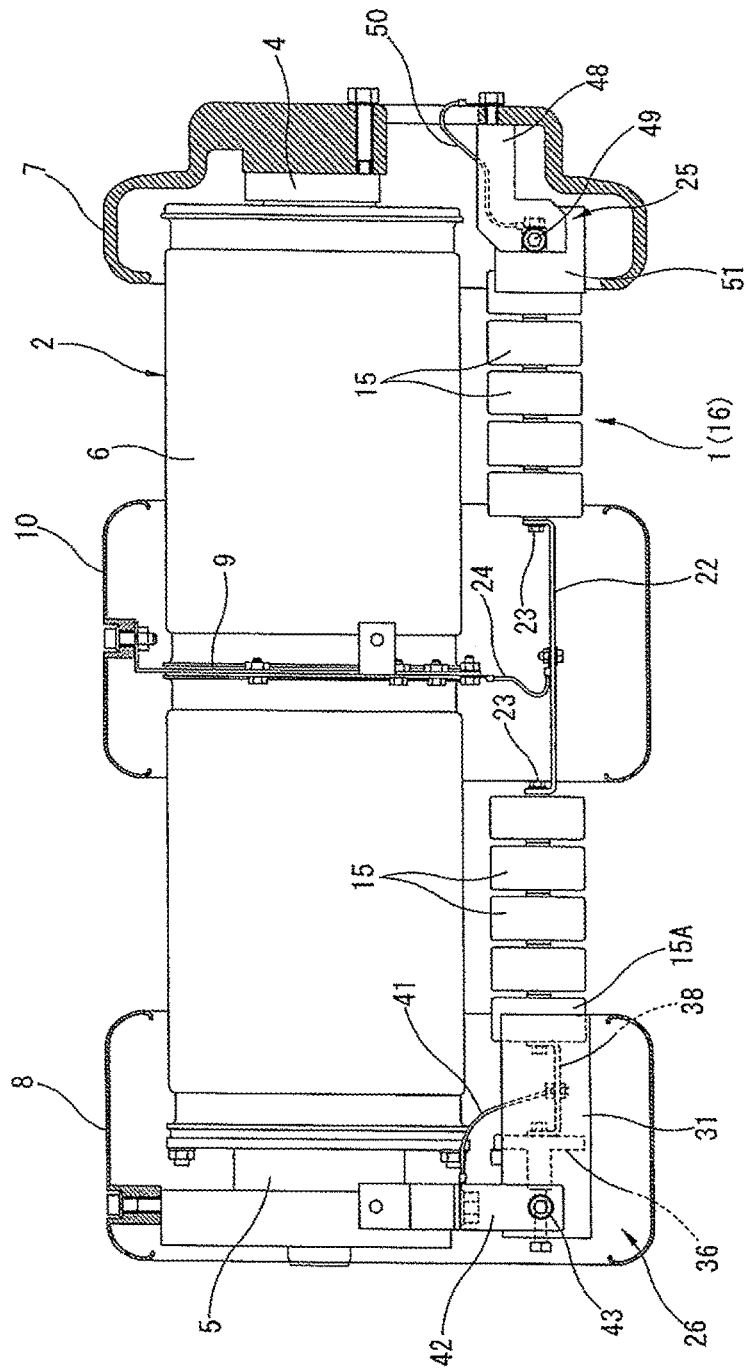
FIG. 8 is a front view showing a second embodiment in which a second insulation tube is provided at the fixed supporting unit side.

Next, FIG. 8 shows a second embodiment of the voltage dividing capacitor 1 according to the present invention. In this second embodiment, in addition of the insulation tube 31 provided on the movable supporting unit 26 side of the capacitor series 16, a second insulation tube 51 is provided on a side of the fixed supporting unit 25 fixedly supporting the one end of the capacitor series 16. A basic structure of the insulation tube 51 is the same as that of the insulation tube 31 provided on the movable supporting unit 26 side. The second insulation tube 51 is made of insulating material such as FRP (fiber reinforced plastics), and is formed into a tubular shape having a substantially C-shaped cross section with a part at the vacuum interrupter 2 side of the tube being open. Apart in the longitudinal direction of the capacitor series 16 is then fitted into an inner circumferential surface of the second insulation tube 51 through the above-mentioned sheet 32 made of fluorocarbon polymers-made.

More specifically, only a capacitor element 15 (denoted by a reference sign 15B) of the capacitor series 16, which is positioned closest to the fixed supporting unit 25, is fitted into the second insulation tube 51. And, a tip end 51a of the second insulation tube 51 terminates at the cylindrical surface 19b of the molded portion 19 without covering the R-chamfer portion 19a of the capacitor element 15B. The second insulation tube 51 is supported by the pin 45 of the fixed supporting unit 25 penetrating the second insulation tube 51.

In this manner, by also providing the second insulation tube 51 on the fixed supporting unit 25 side, the supporting strength of the capacitor series 16 is increased. Further, also in the case of the second insulation tube 51, in the same manner as the insulation tube 31, since electric field is maximum in the middle of the five capacitor elements 15, the forming of the triple junction at a portion where the high electric field appears can be avoided.

Moreover, in addition to the insulation tube 31, a third insulation tube could be provided in the middle in the longitudinal direction of the capacitor series 16, i.e. at a circumference of the middle conductor 22, and a pair of capacitor elements 15 positioned at both sides of the middle conductor 22 could be fitted into this third insulation tube, although this configuration is not shown in the drawing. In the same manner as the second insulation tube 51, for instance, the third insulation tube can be supported by the middle shield 10 through a pin that penetrates the third insulation tube in a diameter direction of the third insulation tube and brackets.

Figure 9:
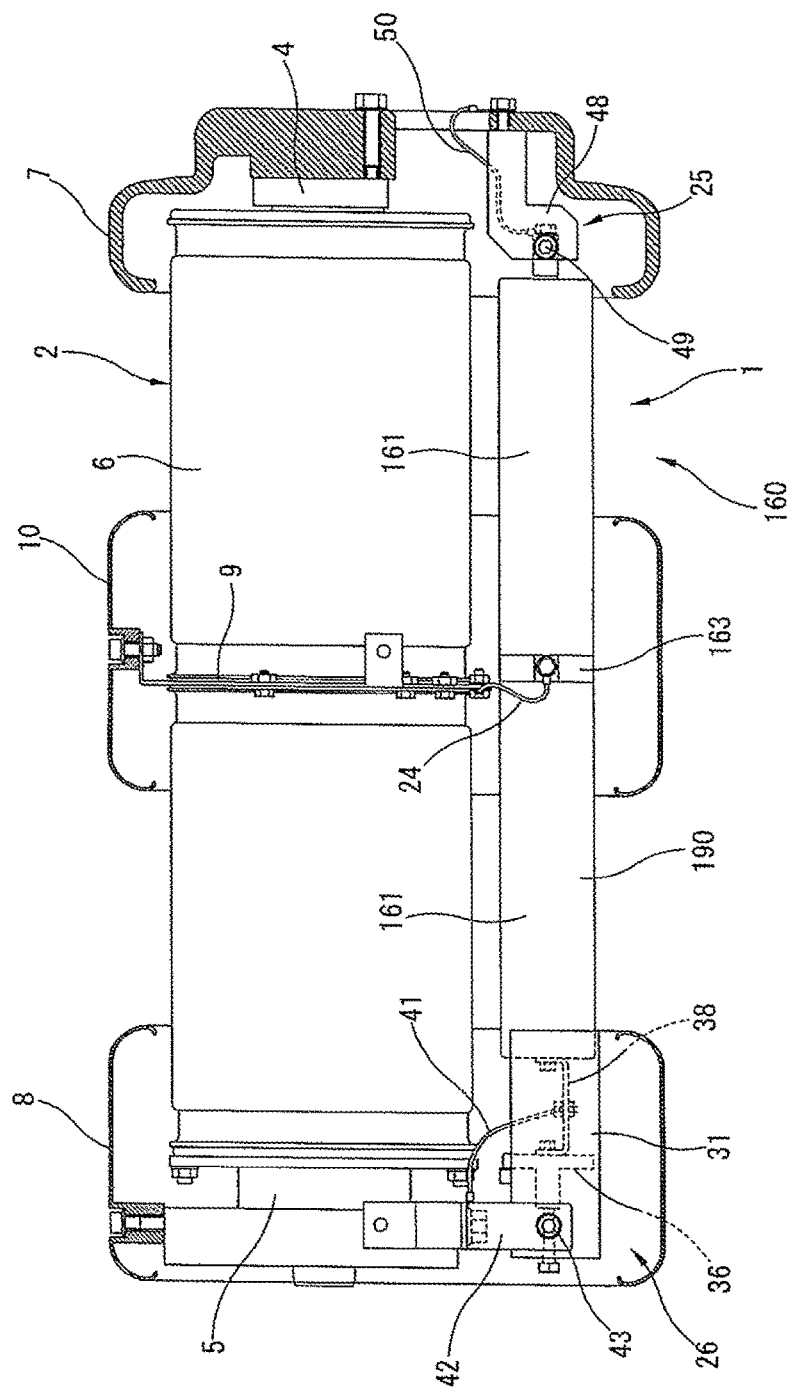
FIG. 9 is a front view showing a third embodiment in which a molded capacitor is used.

Next, FIG. 9 shows a third embodiment in which a molded capacitor 160 is used as the capacitor series 16. This molded capacitor 160 is configured such that the outer circumferences of the plurality of capacitor elements 15 connected and fixed to each other with the connecting screw 21 as explained in the first embodiment are further molded with a secondary molded portion 190, and the molded capacitor 160 has a long narrow cylindrical shape. Especially in the present embodiment, as shown in an explanatory drawing of FIG. 10A, a first capacitor series unit 161 including five capacitor elements 15 and a second capacitor series unit 162 including five capacitor elements 15 are integrally molded with the secondary molded portion 190 together with a ring-shaped middle capacitor conductor 163 located in the middle of both the first and second capacitor series units 161 and 162. Here, FIGS. 10B and 10C show modified examples of the molded capacitor 160. In the example of FIG. 10B, the middle capacitor conductor 163 is provided only at a part in a circumferential direction of the molded capacitor 160. In the example of FIG. 10C, the first capacitor series unit 161 and the second capacitor series unit 162 are individually molded, and these first and second capacitor series units 161 and 162 are firmly connected through the middle capacitor conductor 163. As the molded capacitor 160, any of the examples of FIGS. 10A to 10C can be possible.

Figure 10A:
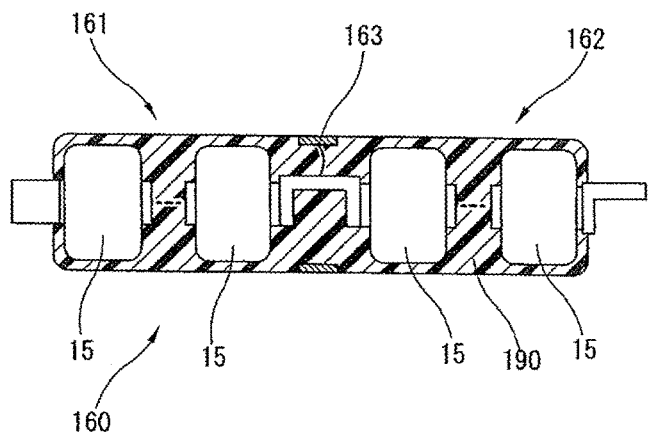
FIGS. 10A to 10C are sectional views for explaining an inside structure of the molded capacitor.
Figure 10B:
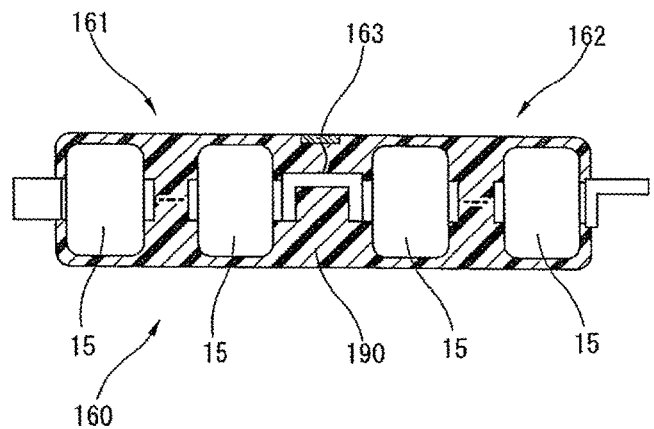
Figure 10C:
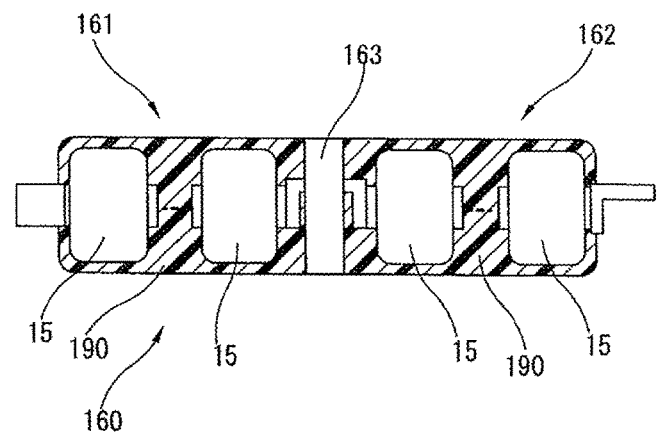

As shown in FIGS. 10A to 10C, the middle conductor 163 is electrically connected to the five capacitor elements 15 and other five capacitor elements 15 between them. Further, as shown in FIG. 9, the middle capacitor conductor 163 is electrically connected to the arc shield 9 of the vacuum interrupter 2 through the sheathed electric wire 24.

In the case of the configuration in which the molded capacitor 160 formed by sheathing or covering the capacitor elements 15 with the secondary molded portion 190 is used as described above, since rigidity of the capacitor series 16 itself is increased, even though the entire length of the insulation tube 31 is short, a high supporting strength of the capacitor series 16 can be obtained.

Here, in the same manner as the second embodiment, it is possible to add the second insulation tube 51 on the fixed supporting unit 25 side. Further, it is possible to add the third insulation tube at a circumference of the middle capacitor conductor 163.

Although the embodiments of the present invention have been explained, the present invention is not limited to the above configurations having the pair of vacuum interrupters 2, but can be applied to a voltage dividing capacitor used for a variety of types of vacuum interrupters. Further, in the above embodiments, the movable supporting unit 26 of the voltage dividing capacitor 1 is placed on the movable side conductor 5 side of the vacuum interrupter 2. However, the movable supporting unit 26 of the voltage dividing capacitor 1 could be placed on the fixed side conductor 4 side of the vacuum interrupter 2. Moreover, the present invention can be applied to even a configuration in which the middle conductor 22 is not provided in the capacitor series.

The invention claimed is:

1. A voltage dividing capacitor arranged parallel to a vacuum interrupter comprising:
   a capacitor series configured by a plurality of capacitor elements being connected and fixed in series, wherein each of the capacitor elements has a dielectric substance between a pair of conductors and a cylindrical molded portion at an outer circumferential side of the capacitor element, the capacitor series as a whole having a long narrow cylindrical shape;
   a fixed supporting unit fixedly supporting one end of the capacitor series;
   a movable supporting unit movably supporting the other end of the capacitor series in a longitudinal direction of the capacitor series, the movable supporting unit being provided with a disk-shaped movable member and an elastic member; and
   an insulation tube secured to the movable supporting unit, the insulation tube having a substantially C-shaped cross section into which at least the disk-shaped movable member of the movable supporting unit is fitted, wherein a length of the insulation tube is set to such a length that a tip end of the insulation tube does not protrude from an end surface, on a fixed supporting unit side, of the molded portion of a first capacitor element that is positioned closest to the movable supporting unit.

2. The voltage dividing capacitor as claimed in claim 1, wherein:
   the first capacitor element is fitted into the insulation tube.

3. The voltage dividing capacitor as claimed in claim 2, wherein:
   the tip end of the insulation tube terminates at a cylindrical surface of the molded portion of the first capacitor element without covering a chamfer portion, on the fixed supporting unit side, of the molded portion of the first capacitor element.

4. The voltage dividing capacitor as claimed in claim 1, wherein:
   the capacitor series is configured as a molded capacitor configured such that outer sides of the plurality of capacitor elements arranged in series are molded with a secondary molded portion.

5. The voltage dividing capacitor as claimed in claim 1, wherein:
   the insulation tube is covered with a cylindrical shield that covers an end portion of the vacuum interrupter.

6. The voltage dividing capacitor as claimed in claim 1, wherein:
   the capacitor series has, in the middle thereof, a conductor electrically connected to a middle shield that covers a middle portion of the vacuum interrupter.

7. The voltage dividing capacitor as claimed in claim 1, wherein:
   a second insulation tube having a substantially C-shaped cross section into which a part, on a fixed supporting unit side of the longitudinal direction, of the capacitor series is fitted is secured to the fixed supporting unit.

\* \* \* \* \*